May 17, 1960 P. G. KAPPUS 2,936,973
VTOL AIRCRAFT
Filed Sept. 6, 1957
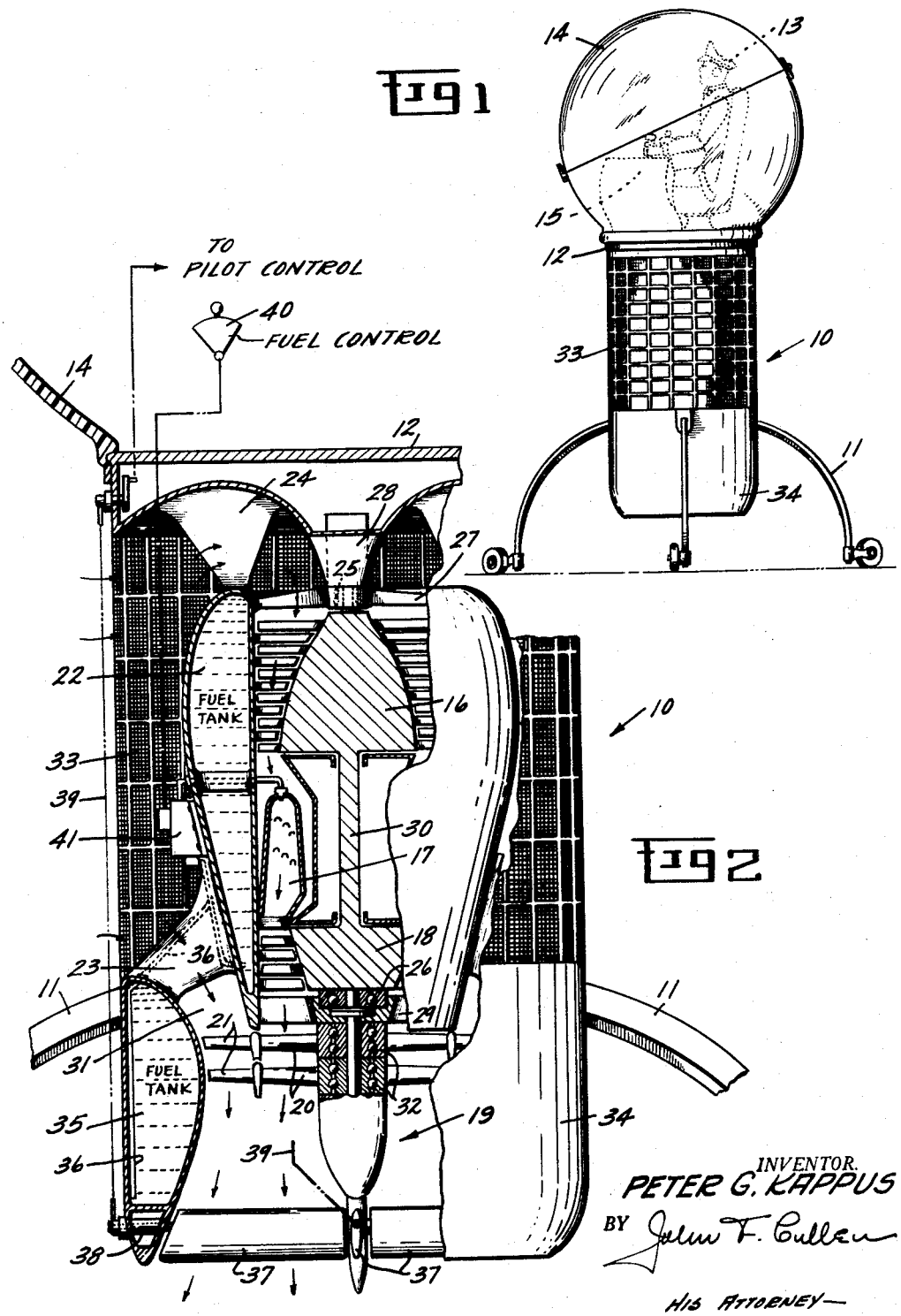
INVENTOR.
PETER G. KAPPUS
BY John F. Cullen
HIS ATTORNEY—

United States Patent Office 2,936,973
Patented May 17, 1960

2,936,973

VTOL AIRCRAFT

Peter Gottfried Kappus, Cincinnati, Ohio, assignor to General Electric Company, a corporation of New York Application September 6, 1957, Serial No. 682,328

6 Claims. (Cl. 244—23)

The present invention relates to a VTOL aircraft and, more particularly, to a vertical take-off and landing aircraft using a ducted-fan engine in which a smooth external vehicle surface completely encloses all the rotating and control elements.

In recent years, much emphasis has been placed on the development and perfection of the so called VTOL or vertical take-off and landing type of aircraft. This is an aircraft that requires no runway and takes off directly upward or substantially so and is then directed forwardly by either shifting weight or by suitable control surfaces to provide a horizontal component of force. In some propeller driven types of VTOL aircraft, the whole vehicle or engine is tilted for horizontal flight. The advent of the jet engine has indicated it to be a desirable powerplant for such an aircraft if suitable control means and size can be obtained in an efficient vehicle to make the project feasible. As is well known, the jet engine consumes relatively high quantities of fuel which can be a distinct disadvantage in VTOL aircraft which are designed for subsonic or low subsonic forward operations in that the vehicles have a very short range of operation. Another disadvantage is that such vehicles are inherently unstable in flight. Consequently, there is a need for a vehicle of this type which will have a clean outward appearance within practical size limits and be capable of sustained flight at high subsonic operation with a practical specific fuel consumption.

Many of the VTOL aircraft of the type discussed here are nothing more than flying engines with a load platform to carry the pilot. Devices of this type, which have thus far been perfected, have been either propeller operated or, in those employing jet engines, have been limited by very short flight duration, time, and relatively low speeds.

It is a primary object of the present invention to provide a VTOL aircraft which will have a much higher sustained operation time with economy of operation in fuel consumption and which is capable of higher flight speeds than similar aircrafts heretofore known.

Another object of the invention is to provide such a vehicle which has a high ratio of fuel load to gross weight and is self contained in that all the rotating parts and controls are completely enclosed within the vehicle itself to prevent external drag and provide completely flexible control.

A further object is to provide such a vehicle which attains these objectives by the use of a ducted fan engine in combination with enclosed control surfaces in the nozzle or exhaust stream within the confines of the vehicle.

Briefly stated, in accordance with my invention, I provide a vehicle housing which carries a load sustaining platform at one end and has a nozzle at the opposite end. Within the housing, there is provided a gas generator with a ducted fan which is separate from the generator and provides for a larger mass flow and economy of operation. This is attained within a vehicle of relatively small diameter for its thrust capabilities.

My invention will be better understood from the following description taken in connection with the accompanying drawing and its scope will be pointed out in the appended claims.

In the drawing:

Figure 1 is an elevation view of the VTOL aircraft of the instant invention as it would appear on the ground and, Figure 2 is a cross sectional view illustrating the internals of such an aircraft.

Referring first to Figure 1, a VTOL aircraft of the type described in the instant invention, may be termed a flying engine, since, in effect, it consists of nothing more than a barrel-like housing generally indicated at 10, which is supported at one end in a vertical position on the ground by suitable supporting means 11 and carries at the other or upper end a load carrying platform 12 which may accommodate the pilot 13. The pilot may or may not be enclosed by a suitable protecting canopy 14. In order to pilot the aircraft, a suitable control panel 15 is provided.

As shown in Figure 2, housing 10 may be a tubular housing of generally cylindrical shape although it is not limited to the cylindrical form. Coaxially arranged within the housing is a powerplant of the jet engine type. This may preferably comprise a gas generator engine of the axial flow type including a compressor section 16, a combustion section 17 which may be annular or cannular as shown, and a turbine section 18. This structure which, in effect, is a turbojet engine minus the nozzle is generally referred to as the main engine.

In order to provide for economical operation with relatively low specific fuel consumption within a vehicle of much smaller diameter than heretofore believed necessary, I employ a powerplant of the ducted fan type. This may comprise a free rotating turbine 20 having fan blades 21 on the extremity thereof.

For compactness of operation and high ratio of fuel load to gross load, fuel tanks 22 may form the outer casing of the gas generator or main engine. The fuel tanks are supported within housing 10 by means of struts 23 and 24. In order to provide for aligned rotation of the turbine and compressor, bearing 25 is supported from the fuel tanks by struts 27 and from the housing by strut 28 and bearing 26 is supported from the fuel tank by strut 29. The engine shaft 30 is supported in these bearings.

The increased mass flow obtained by the use of the ducted fan engine is obtained by the provision of the bypass duct 31 between the housing and the engine in which ducted fan blades 21 compress additional air for increased mass flow. Fan blades 21 are driven by free turbine or turbines 20 which are supported in bearing 32 separate from bearing 26. Thus the turbine 20 is disconnected from and freely rotatable with respect to the main engine. It is to be noted that the free fan may comprise a single stage, or plurality of stages as shown which stages may rotate in the same direction as the main engine or in the opposite direction. In addition, if a plurality of stages is provided, the stages may rotate in opposite directions relative to one another. The direction of rotation will be determined by the characteristics desired of the particular powerplant.

In order to provide air for the powerplant as thus far described, the periphery of the housing 10 is supplied with a plurality of openings preferably in the upper portion thereof which openings may be covered by screen member 33. Thus, substantially the whole periphery of the housing member 10 is an air intake surface. The air for the main engine flows upwardly around struts 24 and into the compressor section 16 as shown by the arrows. The air to the bypass duct flows directly to said duct past struts 23 as shown by the arrows.

An exit nozzle 19 is provided for the aircraft by the provision of extension 34 which may conveniently form separate fuel tanks as auxiliary tank 35 and may be shaped in the form of a nozzle of the desired pattern. Auxiliary tank 35 connects with the main tank 22 by means of conduit 36.

Control of the aircraft is achieved by the provision of control vanes 37 which may lie in a transverse plane at the nozzle exit 19 and may be any suitable number as required. As shown, they consist of four vanes in the shape of a cross and these vanes are pivoted for independent rotation about their longitudinal axes by pivot means 38 which are carried and supported in the end of fuel tank 35. In addition, as desired, vanes 37 may serve as additional support for the free turbine and rotor at the downstream end thereof.

Actuation of vanes 37 is provided by control means 39 connected to the vanes and to the pilot compartment on the load carrying surface or platform 12. The control means may be either external as shown for clarity or internal. Internal mounting of the control means is preferable to provide a clean outer surface to the vehicle.

It is to be noted that the control vanes 37 are located within the nozzle 19 and completely within the fan slipstream as well as the engine exhaust stream. The engine exhaust stream and fan stream provide the vertical lift and the orientation of control vanes 37 determine the forward component. With the instant arrangement, it is possible to provide high forward speeds.

Among other suitable controls on control panel 15 is the aforementioned vane control means 39 and a fuel control 40. Fuel control 40 is connected to the fuel tanks through a regulator 41 to provide the proper amount of fuel injection to the combustors and combustion section 17 as clearly shown.

The operation of the aircraft will be apparent from the above description. The gas generator or main engine provides thrust directly by its exhaust gases exiting from nozzle 19. In addition, the gas generator acts as a powerplant generating exhaust to drive the fans for increased mass flow through the fan duct or bypass duct or bypass 31 which stream also exits through nozzle 19. All of the parts are completely enclosed within housing 10 to provide a clean aerodynamic external surface and a smaller diameter for a given thrust is provided by the use of the ducted fan engine. Forward motion is obtained by the orientation of the control vanes 37 after take-off has been achieved.

While I have described a preferred form of my invention, it will be apparent to those skilled in the art that various changes and modifications may be made and it is intended to cover in the appended claims all such changes and modifications that come within the true spirit and scope of the invention.

What I claim as new and desire to secure by Letters Patent of the United States is:

1. A VTOL aircraft comprising, a tubular housing closed at one end to form a load carrying surface and having a nozzle opening at the other end, a gas generator engine supported in spaced relation within said housing and exhausting through said nozzle, a bypass duct between said engine and housing exhausting through said nozzle, air intake openings in the wall of said housing supplying said engine and duct, movable control vanes carried by said housing within said nozzle, and control means connected to said vanes to vary the orientation of the vanes.

2. A VTOL aircraft comprising, a tubular housing closed at one end to form a load carrying surface and having a nozzle opening at the other end, a gas generator engine supported in spaced relation within said housing and exhausting through said nozzle, a bypass duct between said engine and housing exhausting through said nozzle, fans in said duct driven by said engine combustion products, air intake openings peripherally disposed in said housing supplying said engine and duct, a plurality of movable control vanes carried by said housing within said nozzle, and control means connected to said vanes to vary the orientation of the vanes.

3. A VTOL aircraft comprising, a tubular housing closed at one end to form a load carrying surface and having a nozzle opening at the other end, a gas generator engine supported in spaced relation within said housing and exhausting through said nozzle, a bypass duct between said engine and housing exhausting through said nozzle, at least one free fan coaxial with said engine extending into said duct and driven by the combustion products of said engine, screened air intakes peripherally disposed in said housing supplying said engine and duct, a plurality of movable control vanes carried by said housing downstream of said fan and within said nozzle and control means connected to said vanes to vary the orientation of the vanes.

4. A VTOL aircraft comprising, a cylindrical housing closed at one end to form a load carrying surface and having a nozzle opening at the other end, an axial flow gas generator engine supported in spaced relation within said housing and exhausting through said nozzle, a bypass duct between said engine and housing exhausting through said nozzle, a second free turbine of at least one stage downstream of said engine, fan blades on the periphery of said free turbine and extending into said duct, said free turbine being driven by the combustion products of said engine, screened air intake openings peripherally disposed in said housing supplying said engine and duct, a plurality of rotating control vanes carried by said housing and disposed within said nozzle in a plane transverse to the engine axis downstream of said fan, and control means connected to said vanes to vary the orientation of the vanes.

5. A VTOL aircraft comprising, a cylindrical housing closed at one end to form a load carrying surface and having a nozzle opening at the other end, an axial flow gas generator engine supported in spaced relation within said housing and exhausting through said nozzle, a bypass duct between said engine and housing exhausting through said nozzle, fuel tanks surrounding said engine and forming the casing thereof, at least one second free turbine coaxial with said engine and downstream thereof, fan blades on the periphery of said free turbine extending into said duct, said free turbine being driven by said engine combustion products, air intake openings peripherally disposed in said housing supplying said engine and duct, a plurality of movable control vanes carried by said housing in said nozzle at the exit thereof, said vanes being disposed in a plane transverse to said engine axis, and control means connected to said vanes to vary the orientation of the vanes.

6. A VTOL aircraft comprising, a cylindrical housing closed at one end to form a load carrying surface and having a nozzle opening at the other end, fuel tanks forming the outer and inner wall of said nozzle and an extension of said housing, an axial flow gas generator engine supported in spaced concentric relation within said housing and exhausting through said nozzle, a bypass duct between said extension and said engine, fuel tanks surrounding said engine and forming the casing thereof, at least one second free turbine coaxial with said engine and downstream thereof, fan means driven by said free turbine and extending into said duct, said free turbine being driven by said engine combustion products, air intake opening above said extension in the wall of said housing and supplying said engine and duct, a plurality of rotatable control vanes carried by said extension in said nozzle at the exit thereof and being disposed in a plane transverse to said engine axis, control means connected to said vanes to vary the orientation of the vanes, and means connected to said housing to support said aircraft in upright position on the ground.

References Cited in the file of this patent

UNITED STATES PATENTS

| | | |
|---|---|---|
| 1,440,242 | Porter | Dec. 26, 1922 |
| 2,405,919 | Whittle | Aug. 13, 1946 |
| 2,828,929 | Lippisch | Apr. 1, 1958 |

OTHER REFERENCES

Aviation Week, April 25, 1955, pp. 44, 47.
Aviation Week, August 5, 1957, p. 51.